INVENTOR
Robert MOHR
BY. Kenwood Ross
ATTORNEY.

United States Patent Office 3,482,650
Patented Dec. 9, 1969

3,482,650
HYDROSTATIC SUSTAINING DEVICE
Robert Mohr, Geneva, Switzerland, assignor to Societe Genevoise d'Instruments de Physique, a Swiss firm
Filed Oct. 24, 1966, Ser. No. 588,786
Claims priority, application Switzerland, Oct. 26, 1965, 14,765/65
Int. Cl. F16n 1/00; F01m 1/00; F16k 51/00
U.S. Cl. 184—5        1 Claim

ABSTRACT OF THE DISCLOSURE

In a hydrostatic sustaining system including a pressure chamber for storing an oil cushion between two lubricatable elements and an oil supply circuit for feeding pressurized oil to the pressure chamber and consisting of a supply source and a feed inlet interconnecting the supply source and the pressure chamber and a throttling means in the feed inlet, the improvement in means for eliminating the effects of inoperativeness of the throttling means through the clogging thereof comprising: a normally-closed valve disposed in the feed inlet, an extension on the valve, a passage through the valve and the extension communicating at one end with the throttle and at the opposite end with the pressure chamber, the pressurized oil normally passing from the supply source through the throttle and the passage in the extension and valve into the pressure chamber, the valve being automatically openable when the throttle becomes clogged to permit the pressurized oil to by-pass the throttle and flow directly from the supply source to the feed inlet around the extension and the valve and into the pressure chamber for element lubrication.

---

Figure 1:
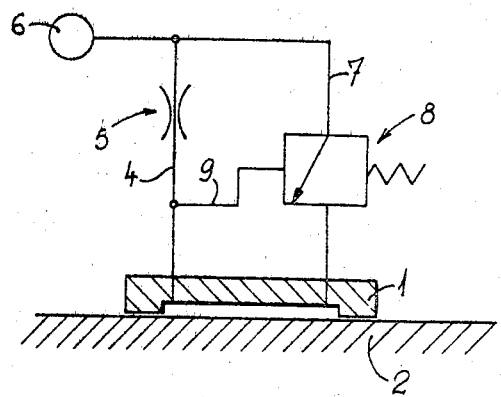

The present invention teaches an hydrostatic sustaining device comprising at least one pressure chamber; this device might be, for instance, an hydrostatic cylindrical bearing, a sliding device, a nut or an hydrostatic thrust.

This device is characterized by the fact that the feeding circuit of the pressure chamber, having a throttle, shows a by-pass bridging the throttle, this by-pass being equipped with a normally closed valve arranged in such a way as to open in case the throttle becomes clogged, so that a lubricating effect ensues and replaces the hydrostatic action stopped by the clogging of the throttle.

The drawing shows, by way of example, one embodiment of the invention.

Figure 2:
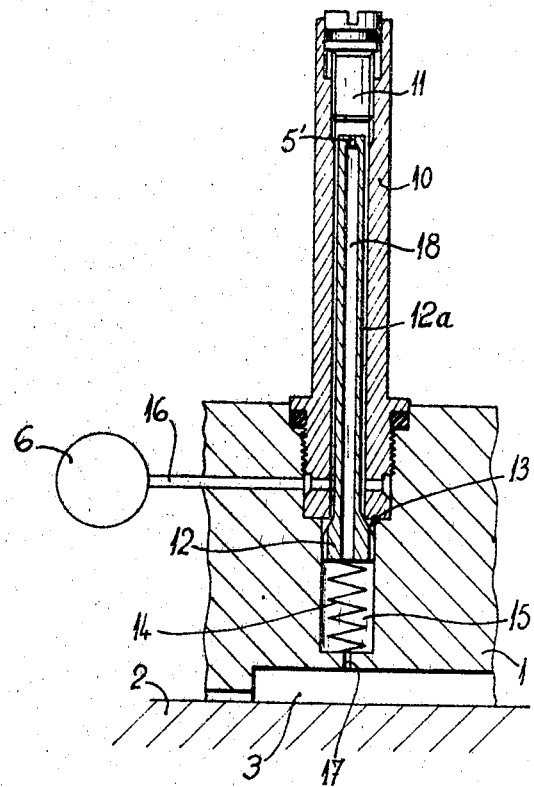

FIG. 1 is an axial sectional view of an hydrostatic sliding device in which the feeding unit is diagrammatically represented, and, FIG. 2 is a fragmentary detailed axial view of a combined form of the feeding unit.

The represented hydrostatic sliding device includes a slider 1 moving on a slide 2. A recess 3, forming a pressured oil chamber, is provided in the body of the slider 1. This chamber 3 is connected to a pressured oil supply 6 by means of a pipe 4, equipped with a throttle 5.

This arrangement ensures the sustaining of the slider on the slide 2.

The feeding pipe 4 of the chamber 3 includes a by-pass 7 bridging the throttle 5. This by-pass is fitted with a valve 8, connected to the pipe 4 by a pipe 9, adjacent the exit of the throttle 5. Valve 8 is arranged in such a way as to react to the difference between the inlet and the outlet pressures at the throttle, so that it opens when this difference goes beyond a definite value, as when the throttle becomes clogged. In this case, the valve 8 opens so that the pressured oil penetrates straight into the chamber 3, and the sliding device, which is no longer self-sustaining, remains nevertheless lubricated under pressure and the risk of jamming is reduced.

This transformation of the sustaining device into a simple lubricator under pressure is specially useful when the installation includes several devices, such as slides, bearings, nuts or any others, in multiple connection, for the reason that the clogging of the throttle of one of the devices passes unnoticed, because the feeding pressure does not increase perceptibly.

As shown in FIG. 2, the throttle and valve of the by-pass are embodied in a unique combined device. This combined device includes a tube part 10 secured to the slider 1, closed at one of its ends by a screw 11. The opposite end of the tube 10 forms a seat, preferably at a sharp angle, for a valve body 12, having a frustoconical bearing surface 13 and continuing in a rod or extension 12a set in the tube part 10. This surface 13 of the valve body 12 is held against the seat of tube part 10 by means of an opening coil-spring 14, set in an opening 15 in slider 1. This spring 14 bears, on the one hand, on the valve body 12 and, on the other hand, on the slider 1.

It is to be noted that the screw 11 is a drain-screw, which, when thoroughly screwed, pushes the rod or extension 12a of valve body 12 down and thus allows the opening of the by-pass.

The pressured fluid coming from the pump 6 is brought to the inside of the element 10 through a pipe 16. The opening 15 of the slider 1 communicates with the chamber 3 through a passage 17. The valve body 12 and rod or extension 12a are provided with a central longitudinal passage 18, gauged at its end to form a capillary hole or throttle 5'. The strength of the spring 14 is such that, when the throttle works normally, the bearing surface 13 of the valve body 12 remains in contact with the seat formed by the end of the element 10, the valve being thus closed. In case the gauged passage or capillary hole or throttle 5' becomes clogged, the difference between the inlet and outlet pressures at the throttle increases in such a way that the valve body 12 moves against the action of the spring 14, moving the bearing surface 13 away from the extremity of the element 10. The pressured oil then penetrates straight into the opening 15 and, from there, into the chamber 3, as previously mentioned.

It is to be noted that, due to the sharp angle formed at the end of the element 10, which constitutes the seat on which the surface 13 of the valve body 12 bears, this valve body vibrates when the valve opens, and thus starts a sound warning, indicating that the throttle has become clogged.

As a modification, the capillary hole or throttle 5' could extend the whole length of the rod or extension 12a.

What I claim is:

1. In a hydrostatic sustaining system including a pressure chamber for storing an oil cushion between two lubricatable elements and an oil supply circuit for feeding pressurized oil to the pressure chamber and consisting of a supply source and a feed inlet interconnecting the supply source and the pressure chamber and a throttling means in the feed inlet, the improvement in means for eliminating the effects of inoperativeness of the throttling means through the clogging thereof comprising:
a normally-closed valve disposed in the feed inlet,
an extension on the valve,
a passage through the valve and the extension communicating at one end with the throttle and at the opposite end with the pressure chamber,
the pressurized oil normally passing from the supply source through the throttle and the passage in the extension and valve into the pressure chamber, the valve being automatically openable when the throttle becomes clogged to permit the pressurized oil to by-pass the throttle and flow directly from the supply source to the feed inlet around the extension and the valve and into the pressure chamber for element lubrication.

References Cited

UNITED STATES PATENTS

| | | | |
|---|---|---|---|
| 1,506,434 | 8/1924 | Leins | 251—117 |
| 1,983,227 | 12/1934 | Hall et al. | 251—117 |
| 3,115,156 | 12/1963 | Mortimer | 251—117 X |
| 2,788,862 | 4/1957 | Langer | 184—5 |
| 3,032,142 | 5/1962 | Axer et al. | 184—5 |

FOREIGN PATENTS 1,372,163    8/1964    France.

HOUSTON S. BELL, Jr., Primary Examiner

U.S. Cl. X.R.

184—6; 251—117